United States Patent [19]

Kinney

[11] Patent Number: 4,981,311
[45] Date of Patent: Jan. 1, 1991

[54] COUPLING ASSEMBLY

[75] Inventor: Gerald R. Kinney, Bloomfield, Iowa

[73] Assignee: Caterpillar Inc., Peoria, Ill.

[21] Appl. No.: 382,364

[22] Filed: Jul. 20, 1989

[51] Int. Cl.⁵ ............................................. F16L 35/00
[52] U.S. Cl. ..................................... 285/302; 285/368; 285/918; 285/909
[58] Field of Search ................. 285/24, 302, 368, 233, 285/918, 909, 910

[56] References Cited

U.S. PATENT DOCUMENTS

| | | | |
|---|---|---|---|
| 2,467,911 | 4/1949 | Reilly | 285/302 |
| 3,989,283 | 11/1976 | Pepper | 285/323 |
| 4,150,847 | 4/1979 | DeCenzo | 285/93 |
| 4,183,560 | 1/1980 | Wyss | 285/232 |
| 4,522,433 | 6/1985 | Valentine et al. | 285/233 X |
| 4,588,309 | 5/1986 | Uyehara et al. | 175/227 X |
| 4,603,886 | 8/1986 | Pallini, Jr. et al. | 285/24 |
| 4,615,812 | 10/1986 | Darling | 210/805 |

FOREIGN PATENT DOCUMENTS

| | | | |
|---|---|---|---|
| 1420486 | 11/1965 | France | 285/368 |
| 1420487 | 11/1965 | France | 285/368 |
| 553722 | 1/1977 | Japan | 285/302 |

Primary Examiner—Dave W. Arola
Assistant Examiner—Arlen L. Olsen
Attorney, Agent, or Firm—Kenneth A. Rhoads

[57] ABSTRACT

The invention relates to a coupling assembly for connecting two members. The coupling assembly prevents excessive radial movement, scrubbing of the coupling members, and leakage of fluid being transferred through the coupling. The coupling assembly includes a tube end having a pair of spaced apart annular beads defining a groove for a resilient seal ring seated in the groove and the other member defined a bore for receiving the tube end. A guide ring substantially centers the tube in the bore whereupon a clamping assembly releasable connected to the tube is clamped to the other member securing the tube in the centered position while permitting limited axial movement of the tube.

10 Claims, 2 Drawing Sheets

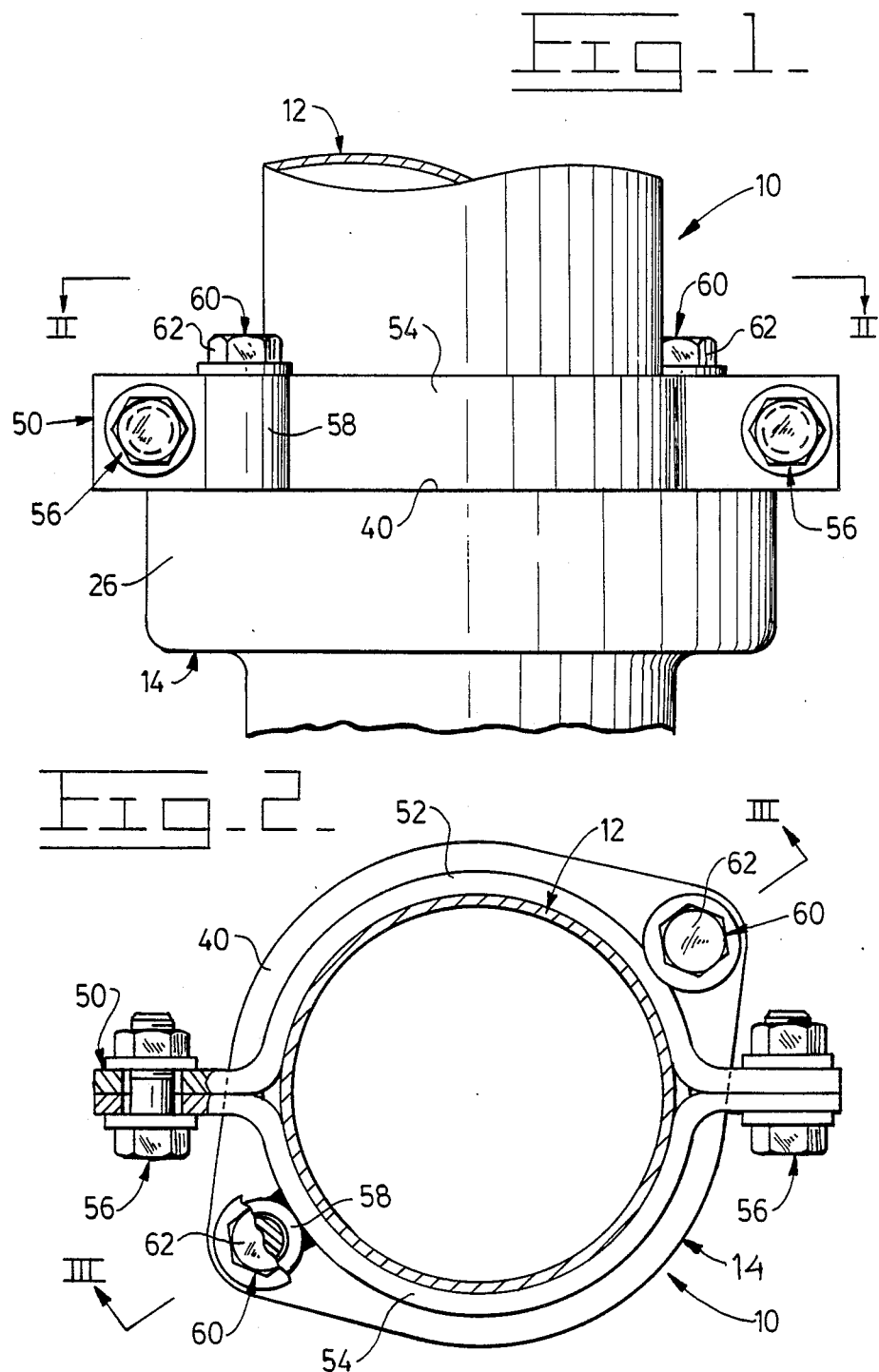

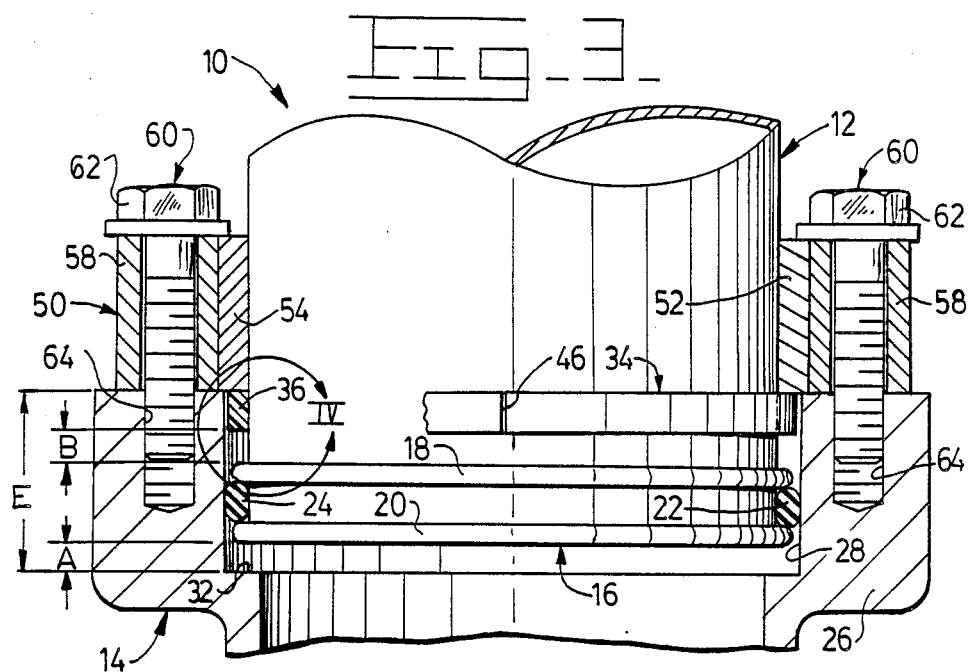
Fig_3_
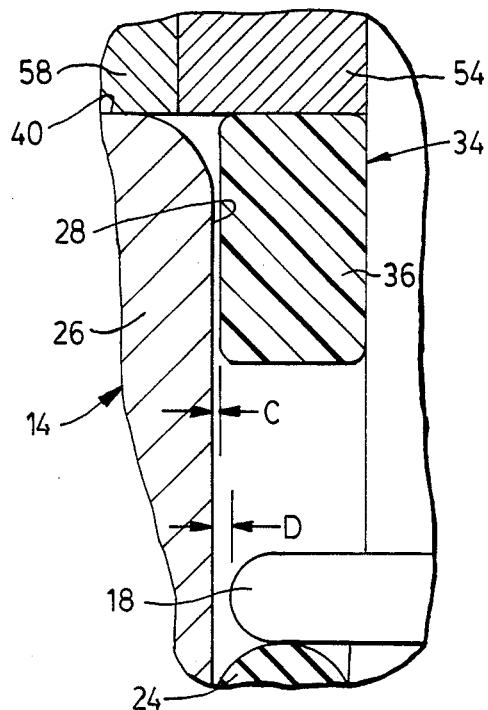
Fig_4_

COUPLING ASSEMBLY

DESCRIPTION

1. Technical Field

This invention relates to an assembly for coupling one member to another member and more particularly to a sealed joint or coupling.

2. Background Art

There are numerous systems in which it is necessary to couple one member to another member. For example, in earth working vehicles it often is necessary to couple a fluid line or tube, such as an oil line, to another mating member to transfer oil. As a result of these many systems, a wide variety of different couplings have been developed to connect the mating members.

For example, one type of coupling includes a tube having one end with a pair of upset beads forming a groove in which a resilient seal ring sits. This one end is positioned in the bore of another member or mating tube. A retainer partially surrounds the tube is bolted to the member outside the bore, but not in contact with the tube, to retain the tube within the bore. One problem with this design is that it allows excessive angular and radial movement of the tube end within the bore, which can result in scrubbing and abrasion of the beads and the bore and of the seal ring as the tube ends move. This movement can occur as a result of vibration, flexing, and thermal expansion of the mating members. Once the bore and/or beads erode, the seal ring can extrude out of the groove which can result in leakage. Still further, the retainer does not adequately protect the bore from external foreign material such as dirt that can come into contact with the seal ring to cause abrasion and enhance wear of the seal ring.

Accordingly, what is desired is a coupling assembly that will substantially center the tube in the bore of the mating member preventing excessive relative angular movement of the members and contact of the beads with the bore, thus eliminating scrubbing and abrasion of the members. Also what is desired is means to clamp the tube in the substantially centered position while permitting some relative axial movement of the members. The advantage of the invention includes no wear of the component parts with no leakage of the fluid being transmitted from one member to the other member and longer wear life of the seal ring.

The present invention is directed to overcome one or more of the problems set forth above.

DISCLOSURE OF THE INVENTION

In one aspect of the invention, a coupling assembly is provided for releasable connecting a tube to a member defining a cylindrical bore. The tube includes a pair of spaced apart angular beads to define a groove wherein a resilient seal ring is seated. Guide ring means locating the tube in a substantially centered position within the bore preventing the beads from contacting the bore and a clamping assembly releasable connected to the tube removably secures the tube to the member in the substantially centered position.

BRIEF DESCRIPTION OF THE DRAWINGS

FIG. 1 is an elevational view of an embodiment of the present invention;

FIG. 2 is a view taken along lines II—II of FIG. 1;

FIG. 3 is a view in cross section of the coupling assembly showing details of the seal ring, guide ring, and clamp means taken along lines III—III of FIG. 2; and FIG. 4 is an enlarged view of the guide ring and bead area taken along lines IV—IV of FIG. 3.

BEST MODE FOR CARRYING OUT THE INVENTION

Referring to FIGS. 1, 2, and 3, a coupling assembly 10 is shown in which a first member 12 is coupled to a second member 14. As one example, the member 12 is a male tube having an end 16 on which is formed a pair of spaced upset beads 18 and 20. These beads 18 and 20 define a groove 22 in which a relatively soft resilient seal ring or O-ring 24 is seated. The O-ring is of a material such as ethylene propylene diene (EPDM) rubber with a durometer Shore "A" hardness of approximately 70 or flurocarbon rubber (FKM) with a durometer Shore "A" hardness of approximately 75.

The second member 14 is, for example, a female mating member having an end or housing 26 defining an opening or bore 28. The end 16 of the tube 12 is received in the bore 28 with an axial clearance "A" of about 5 mm, in the specific example shown between the bead 20 and an end 32 of the bore 28. This clearance "A" permits the tube 12 to move axially downward as viewed in FIG. 3 when, for example, during assembly and as a result of thermal expansion. In the assembled position, the 0-ring 24 is in sealing engagement with the bore 28.

The coupling assembly 10 also includes guide ring means 34 for locating the end 16 of the tube 12 in a substantially centered position within the bore 28. The guide ring means 34 includes a guide ring 36 preferably having a generally rectangular cross-section which extends into the bore 28 a certain distance below an annular top outer surface 40 of the housing 26 and in upwardly spaced relation to the adjacent bead 18 as shown in FIG. 3. It is recognized that the guide ring 36 could be of other cross-sectional shapes such as cylindrical, oval, or cloverleaf. The guide ring 36 is constructed to define a cavity or clearance "B" between the guide ring and the bead 18. This clearance allows the end 16 of the tube 12 to move upwardly within the bore 28 as viewed in FIG. 3 until contact is made with the guide ring 36. The guide ring 36 thus acts as a positive stop for the tube 12. As best shown in FIG. 4 the guide ring 36 is seated relatively tightly about the tube 12 has a nominal radial clearance "C" of approximately +0.175 mm (+0.007 inch) based on a minimum radial clearance of −0.06 mm (−0.002 inch) and a maximum radial clearance of +0.41 mm (+0.016 inch) in the instant example between the outside diameter (O.D.) of the guide ring and the bore 28. Further, in the instant example there is a nominal radial clearance "D" of approximately +0.330 mm (+0.013 inch) based on a minimum radial clearance of −0.19 mm (0.007 inch) and a maximum radial clearance of +0.47 mm (+0.019 inch) in the instant example between the outside diameter (O.D) of the beads 18 and 20 and the bore 28. The nominal radial clearances "C and D" between the bore 28, the beads 18 and 20, and the guide ring 36 are the clearances that occurs when the ring 36 is assembled on the tube as shown in FIG. 3. Also as shown in FIG. 3 the guide ring 36 is a split ring having a small gap 46 when assembled around the tube 12. The ring 36 is made of a non-metallic material including, for example, heat stabilized polycaprolactum (type 6) nylon thermoplastic having a durometer Rockwell "M" hardness of from 60–80. The hardness of the guide ring 36 preferably is greater than that of the o-ring 24.

The coupling assembly 10 also includes a clamping assembly 50 to secure the tube 12 in the bore 28 after it has been centered in the bore by the guide ring 36. The clamping assembly 50 includes pair of flanged semi-circular clamping bands 52 and 54 that encompass the tube 12. The clamping bands 52 and 54 are secured around the tube 12 by a first plurality of fasteners or bolt assemblies 56. A tubular lug 58 is secured to each of the bands 52 and 54. The clamping assembly 50 is then removably secured to the top outer surface by 40 of the housing 26 by securing means 60 including a second plurality of fasteners or bolts 62 that extend through the tubular lugs 58 and engage with a like number of threaded holes 64 in the housing preventing tilting of the tube 12 relative to the member 14. In this specific instance each of the bands 52 and 54 are identical in construction. Each of the bands 52 and 54 can, for example, be made of steel and the lugs 58 may be secured to the bands at various locations depending upon the construction of the one member 14. It is also recognized that the lugs 58 could be formed as an integral part of the bands 52 and 54.

As one example of the size of the first and second members 10 and 12 shown in FIGS. 1, 2 and 3, the depth "E" of the bore 28 can be about 30.0 mm (1.181 inch), the axial length of the guide ring 36 can be about 6.5 mm (0.256 inch), the diameter of the bore 28 can be about 58.95±0.08 mm (2.321±0.003 inch), and the outside diameter (O.D.) of the tube 12 can be about 50.8±0.13 mm (2.00±0.005 inch).

INDUSTRIAL APPLICABILITY

In operation the end 16 of the tube may move axially in the bore 28 as a result of vibration, flexing, and thermal expansion of the mating members. The clamping assembly 50, that is releasably connected around the tube 12 and clamped to the member 14 by second fasteners 62 prevents tilting of the tube relative to the member and maintains the tube 12 in the substantially centered position preventing scrubbing and abrasion of the beads 18 and 20 with the bore 28. Prior to the clamping assembly 50 being secured to the member 14 the tube 12 is substantially centered in the bore 28 by the guide ring 36. The guide ring 36 which has a hardness greater than the seal ring 24 limits radial movement of the tube end 16. The tube end 16 however can move downwardly as viewed in FIG. 3 due to clearance "A" until bead 20 comes into contact with the end 32 of bore 28 or upwardly due to clearance "B" until bead 18 comes into contact with the guide ring 36. The guide ring 36 acts as a resilient bumper preventing the tube end 16 from moving further out of the bore 28, and thereby, preventing exposure of the o-ring 24 and oil leakage.

Since the guide ring 36 is non-metallic and fairly slippery, there will be little or no wear between the tube 12 O.D. and the guide ring I.D. and the bore 28 and the guide ring O.D.. Further the guide ring 36 and the clamping assembly 50 essentially seals the bore 28 and acts as a shield for the o-ring 24 to minimize the entry of abrasive particles into the bore 28 from outside of the tube !2. Still further, the guide ring 34, being a split ring, provides for easy assembly or joining of the tube 12 to the member 14. For example, after the tube end 16 is placed in the bore 28, the ring 34 can be opened to be placed around the tube 12, there after, the clamping assembly 50 can be secured to the outer surface 40 of the housing 26.

Other aspects, objects and advantages of the invention can be obtained from a study of the drawings, the disclosure and the appended claims.

I claim:

1. A coupling assembly for releasably connecting a tube to a member defining a cylindrical bore, the tube having a pair of spaced apart annular beads defining a groove therebetween and a resilient seal ring seated in the annular groove sealingly engaged with the bore, comprising:

guide ring means for locating the tube in a substantially centered position within the bore preventing the beads from contacting the bore while permitting some relative axial movement of the tube along the axis of the bore, the guide ring means including a guide ring having a hardness greater than that of the seal ring, the guide ring being seated relatively tightly about the tube adjacent one of the annular beads and extending into the bore; and a clamping assembly releasably connected to the tube and means for removably securing the clamping assembly to the member to maintain the tube in the substantially centered position.

2. The coupling assembly of claim 1 wherein the clamping assembly is releasably connected to the tube by a first plurality of fasteners.

3. The coupling assembly of claim 2 where in the means for removably securing the clamping assembly to the member includes a second plurality of fasteners.

4. The coupling assembly of claim 1 wherein the resilient seal ring is an o-ring of a material including ethylene propylene diene (EPDM) rubber with a durometer Shore "A" hardness of approximately 70.

5. The coupling assembly of claim 1 wherein the resilient seal ring is an o-ring of a material including flurocarbon rubber (FKM) with a durometer Shore "A" hardness of approximately 75.

6. The coupling assembly of claim 1 wherein the guide ring is a split-ring.

7. The coupling assembly of claim 1 wherein the clamping assembly includes a pair of flanged semi-circular clamping bands that encompass the tube and a first plurality of fasteners for securing the clamping assembly around the tube.

8. The coupling assembly of claim 7 wherein the member includes a top outer surface and each of the semi-circular clamping bands include a tubular lug secured to the semi-circular band and a second plurality of fasteners that extend through the tubular lugs for securing the clamping assembly to the top surface.

9. The coupling assembly of claim 8 wherein each of the semi-circular bands are identical.

10. A coupling assembly for releasably connecting a tube to a member defining a cylindrical bore, the tube having a pair of spaced apart annular beads defining a groove therebetween and a resilient seal ring seated in the annular groove sealingly engaged with the bore, comprising:

guide ring means for locating the tube in a substantially centered position within the bore preventing the beads from contacting the bore, the guide ring means including a guide ring having a hardness greater than that of the seal ring and of a material including heat stabilized polycaprolactum (type 6) nylon thermoplastic with durometer Rockwell "M" hardness of approximately 70, the guide ring being seated relatively tightly about the tube adjacent one of the annular beads and extending into the bore; and a clamping assembly releasably connected to the tube and means for removably securing the clamping assembly to the member to maintain the tube in the substantially centered position.

* * * * *